Sept. 9, 1969　　　I. M. SKUJA　　　3,466,123
FILM PROJECTION CARTRIDGE
Filed July 13, 1967　　　　　　　　　　　　4 Sheets-Sheet 1
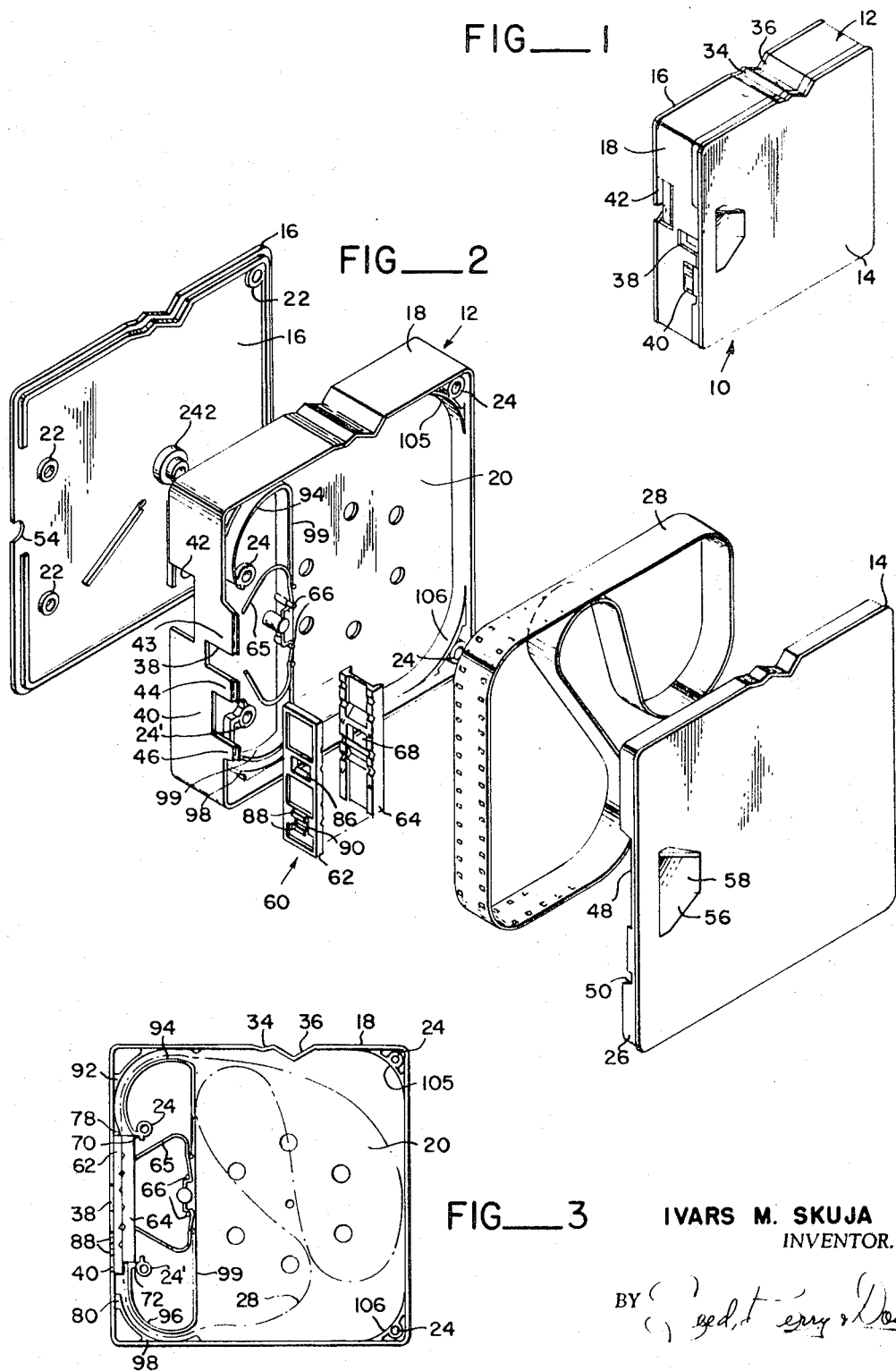
IVARS M. SKUJA
INVENTOR.
BY
ATTORNEYS Sept. 9, 1969　　　　　　　　I. M. SKUJA　　　　　　　　3,466,123
FILM PROJECTION CARTRIDGE
Filed July 13, 1967　　　　　　　　　　　　　　　　　4 Sheets-Sheet 2
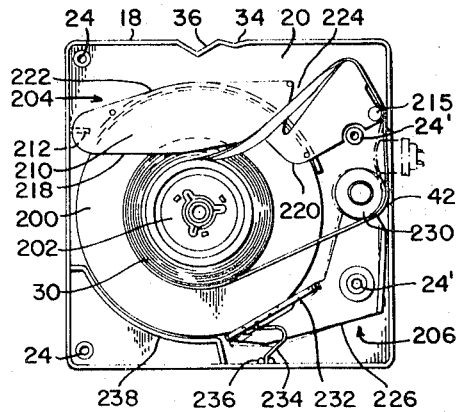
FIG__6
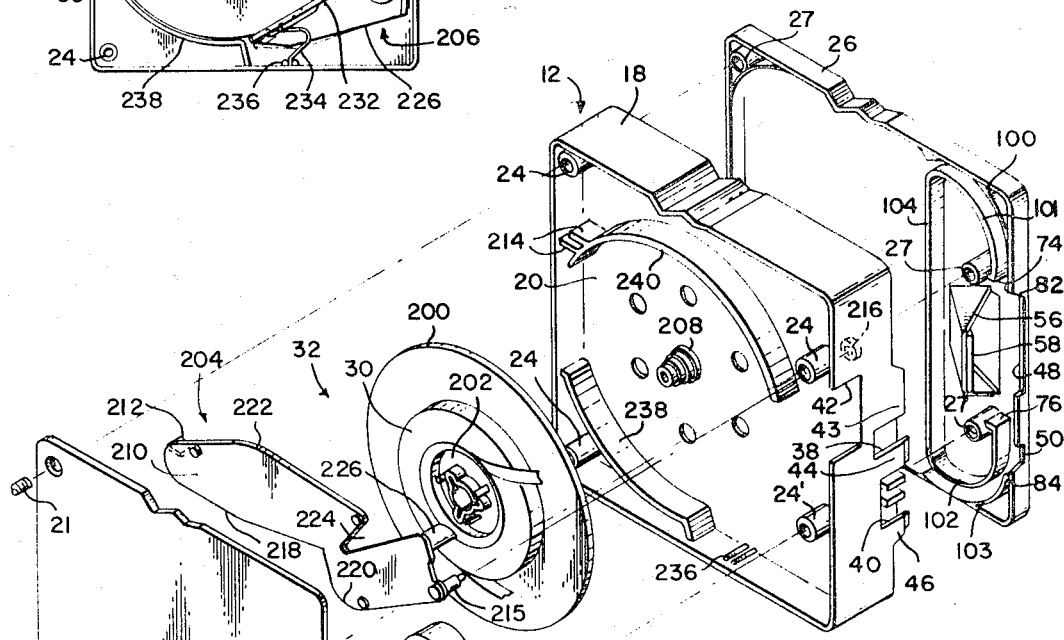
FIG__5
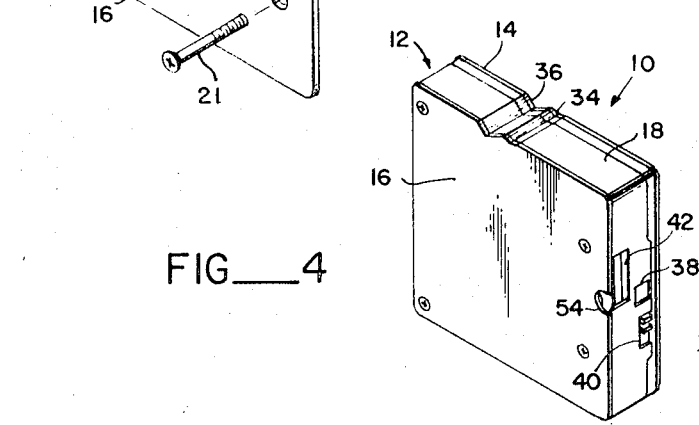
FIG__4
IVARS M. SKUJA
*INVENTOR.*
BY
ATTORNEYS Sept. 9, 1969     I. M. SKUJA     3,466,123
FILM PROJECTION CARTRIDGE
Filed July 13, 1967     4 Sheets-Sheet 3
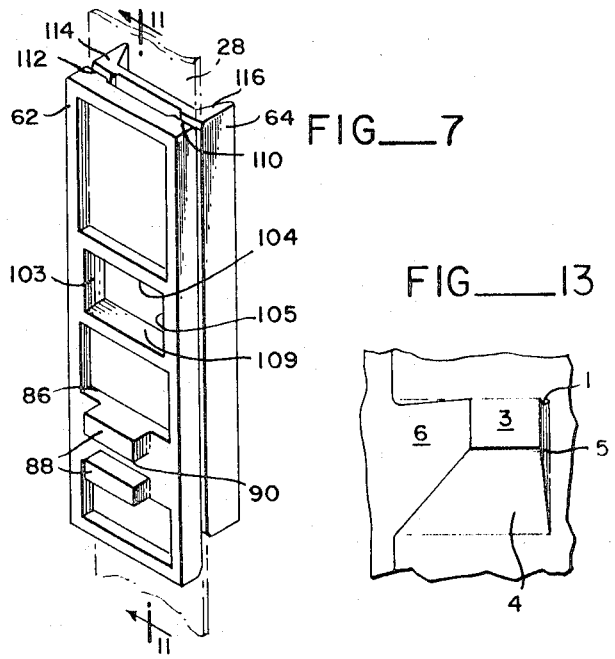
IVARS M. SKUJA
*INVENTOR.*
BY
*ATTORNEYS*

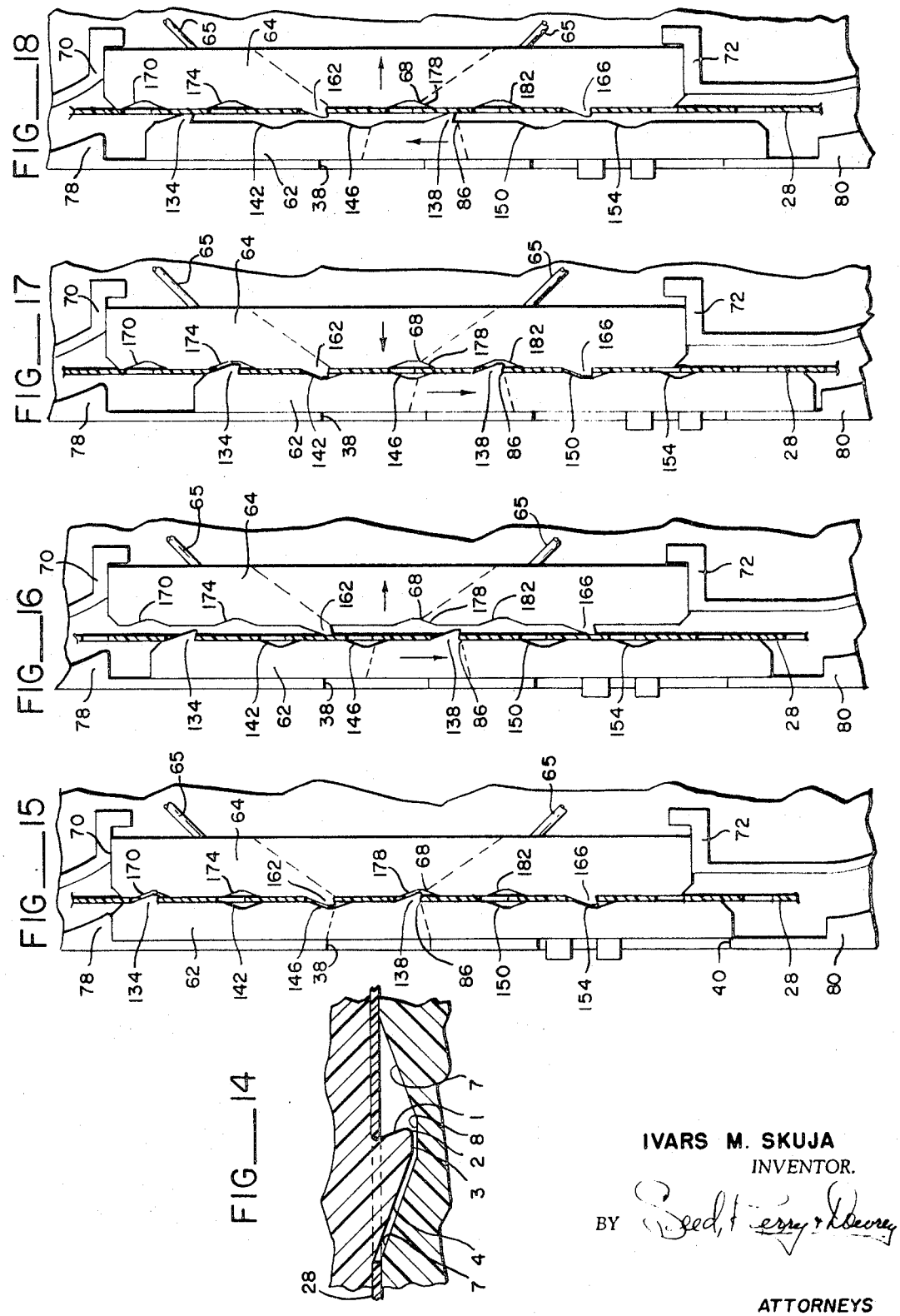

United States Patent Office 3,466,123
Patented Sept. 9, 1969

3,466,123
FILM PROJECTION CARTRIDGE
Ivars M. Skuja, Seattle, Wash., assignor to Audiscan Corporation, Bellevue, Wash., a corporation of Washington
Filed July 13, 1967, Ser. No. 653,240
Int. Cl. G03b 31/02, 23/04
U.S. Cl. 352—34    23 Claims

ABSTRACT OF THE DISCLOSURE

A film projection cartridge is provided with a self-contained film advance assembly adapted to be operably coupled to a projector-mounted actuating mechanism when the cartridge is inserted into a suitable projection system. The cartridge may also contain a sound tape for presentation of an integrated sound-picture program.

---

Film projection systems have heretofore employed film cartridges that are insertable into a projector for frame-by-frame projection of the film contained in the cartridge. These systems employ a projector-mounted film advancing mechanism that contacts the film to advance it once the cartridge is inserted into the projector, such film advancing mechanism usually taking the form of a sprocket wheel or finger that is moved along a complex, non-linear path to engage, disengage and re-engage the film sprocket holes to advance the film. Consequently, the cartridge must be exactly aligned with the film advancing mechanism so that the film can be advanced without injury.

Furthermore, these projection systems employ means other than the film advancing mechanism to gate either the illumination to the film or the image of the screen, and to mask the projected image. Consequently, complicated interlocks must be employed to synchronize the film advancement functions with the image gating and masking functions if a satisfactory film presentation is to be made. Attempts at simplification have included eliminating the gating function altogether and simply advancing the film. This, however, produces the distracting effect of momentary visibility of two film frame images at once on the screen.

Such of these projection systems that also provide a sound-plus-picture presentation either employ a separate sound tape cartridge arranged in such a fashion that the film and sound cartridges must be inserted into the projector by complex maneuvering, or they are limited to use of film that contains a sound track imprinted thereon. In the former case, the projection system often must contain complex cartridge alignment devices and/or synchronizing interlocks. In the latter case, the projection systems are unsuitable for film strip projection where the film is projected intermittently and not continuously as would be required by use of an integral sound track.

A primary object of this invention is to provide a film projection cartridge that does not suffer from the deficiencies noted above. Another object is to provide such a cartridge that contains a film advancing assembly that need only be coupled with a projector-mounted actuating device, the latter device being of a type that does not contact the film. A further object is to provide such a cartridge that contains an assembly for advancing the film, gating the film and masking the projected image without any projector-mounted synchronizing interlocks. Still another object is to provide such a cartridge with a sound tape arranged in side-by-side adjacency with the film such that the cartridge can be directly inserted into a suitable projector for sound-plus-picture presentation without complicated maneuvering of the cartridge or of the related projector-mounted components prior to presentation of the program.

These and other objects and advantages will become apparent from the following discussion, taken in conjunction with the accompanying drawings, of which:

FIG. 1 is a perspective view of the film side of a preferred film projection cartridge embodiment of this invention;

FIG. 2 is an exploded assembly view of the film side of the FIG. 1 cartridge as adapted for an endless film strip;

FIG. 3 is a plan view of the film side of the FIGS. 1–2 cartridge with the film-side cartridge cover removed;

FIG. 4 is a perspective view of the tape side of the FIG. 1 cartridge;

FIG. 5 is an exploded assembly view of the tape side of the FIG. 4 cartridge as adapted for an endless spool-wound sound tape;

FIG. 6 is a plan view of the tape side of the FIGS. 4–5 cartridge with the tape-side cartridge cover removed;

FIG. 7 is a perspective view of a preferred film advance and image gating assembly for use with the cartridge of the invention;

FIG. 8 is a perspective view of the rear or outer side of the back gate component of the FIG. 7 assembly;

FIG. 9 is a plan view of the inner or film side face of the front gate component of the FIG. 7 assembly;

FIG. 10 is a plan view of the inner or film side of the back gate component of the FIG. 7 assembly;

FIG. 11 is a side cross section taken along the line 11—11 of FIG. 7;

FIG. 12 is an enlarged end cross section taken along the line 12—12 of FIG. 11;

FIG. 13 is an enlarged detail plan view of one of the gate components illustrating a typical film sprocket hole engaging element of such gate component;

FIG. 14 is an enlarged side detail view in cross-section of the front and back gate components illustrating the film engaging interaction between the two components; and FIGS. 15–18 are partially-schematic elevation views showing, in sequence, the operation of the FIG. 7 assembly through one film advance cycle.

This invention comprises a film projection cartridge adapted for insertion into a suitable projection system. The cartridge contains a film advance image gating assembly that engages the film sprocket holes to advance the film, gate the film images during film advancement and mask the images during projection. This assembly can be employed with motion picture film and with film-strips. When the cartridge is inserted into the projection system an actuating device is operably coupled to the assembly to effect film advance. In the preferred embodiment of the invention, the cartridge is adapted to contain a sound tape that may have recorded signals thereon employable by the projection system to produce an integrated sound-picture program by synchronizing the film advancement with the sound reproduction.

In FIGS. 1–6, a preferred film projection cartridge 10 is shown as comprising a cartridge housing composed of a film and sound tape container 12, a film-side housing cover 14 and a tape-side housing cover 16. The container 12 has a peripheral wall 18 and a center partition wall or web 20 that divides the container into side-by-side, wall-enclosed film and tape halves. The covers are adapted to be positioned against the container and held in place by screws 21 that extend through bosses 22 in the tape-side cover and bosses 24-24' in the container thread into bosses 27 in the film side cover. The combined width of the peripheral wall 18 and the lip 26 on the film-side cover is sufficient to accommodate the width of the film strip, and the width of the peripheral wall is also sufficient to accommodate the width of sound tape 30 and its storage and dispensing assembly 32.

The upper side of the peripheral wall 18 of container 12 and the corresponding edge sections of covers 14-16 are notched with two parallel, transverse notches (as at 34 and 36 in FIG. 1). The forward notch 34 is shallower than the rearward notch and serves to position or index the cartridge in a cooperating projector in a stand-by or transport non-projecting condition. The rearward notch 36 serves to position or index the cartridge in a projecting condition within such a projector.

The forward side of the peripheral wall 18 is provided with an upper film-side image projecting aperture 38, a lower film-side actuating aperture 40, and a tape-side tape drive and sound head receiving aperture 42 that are closed on their respective vertical outer edges by the respective covers 14 and 16 in the assembled cartridge. The outer edges of the film half of peripheral wall 18 above aperture 38 and below aperture 40 are recessed relative to the edge sections 43, 44 and 46 immediately above aperture 38, below aperture 40 and between apertures 38 and 40, respectively, to receive lip 26 of cover 14. The edges of lip 26 are recessed at 48 and 50 to receive these protruding sections of wall 18. The aperture 38 is closed by the cover edge in the recessed lip section 48. The aperture 40 is closed and partially obstructed by a non-recessed section of lip 26 between recessed lip sections 48 and 50. In the assembled condition, the apertures 38 and 40 are centered relative to the film strip edges.

The forward edge of the tape-side cover 16 is provided with a circular cut-out 54 adjacent to the lower edge of the aperture 42 to receive a capstan tape drive.

The side wall of cover 14 is provided with a recess 56 containing an opening and a reflection mirror 58 mounted therein to reflect an external projection light beam (from a lamp mounted in a suitable projector) at right angles through the image projection and through the aperture 38.

The opening created by recess 56 also permits ambient air to be circulated against the backside of the film in the gate structure to cool the film and prevent the film frames from "popping" during projection. Furthermore, such air will circulate through the film-side compartment to pre-warm the film to ambient temperature, such air being vented through holes in the web 20 into the tape-side compartment wherein it circulates and is finally vented from the cartridge through aperture 42. Circulation of ambient air to bring the film to ambient temperature will ensure satisfactory image projection and enhance film life even though a program presentation is made with cold film, as might result from transport through wintery atmosphere conditions. Circulation of air through the tape-side compartment will cause dust particles therein, for example from the graphite tape lubricant usually employed in continuous loop lubricated tape, to be exhausted through aperture 42, thereby preventing sound quality-deterioration dust build-up on the tape.

Because the cartridge is designed as described above with the operating apertures 38-40-42 in the forward or front wall of the cartridge, the cartridge can be inserted into operable position within a suitable projector simply by sliding it straight into the projector. There is no need to maneuver the cartridge in some complex fashion in order to properly align its operating apertures within the projector.

The structure within the film-side of the container 12 is as follows.

A film advance and image gating assembly 60 is positioned inside of the container against the forward side of the peripheral wall 18. This assembly, described in greater detail subsequently, comprises two sections hereinafter called a "front gate" 62 and a "back gate" 64 that are of about the same width as the film and that cooperate to guidingly advance the film past the aperture 38, gate the image during film advancement, and mask the projected image. The film strip 28 passes between the adjacent inner faces of these sections as shown in FIG. 3.

A round wire spring clip 65 is positioned between retainer pins 66 and has arcuate arms that interfit into the back face of the back gate 64 to resiliently urge the assembly 60 forward. The interfit between the spring arms and the back gate is such that the back gate can move laterally rearward and forward (i.e., normal to the plane of the aperture 38) during operation of the assembly 60. Upper and lower right-angled stops 70 and 72 protrude from the web 20 to receive the adjacent edges of the back gate to restrain the back gate against longitudinal movement (i.e., movement parallel to the plane of the aperture 38) and to limit the amount of lateral movement possible against the action of spring clip 65 The forward edge of the recess 56 is aligned with the sections of stops 70-72 that are parallel to aperture 38 to also limit the amount of lateral movement of the back gate.

As positioned by stops 70-72-74-76, the back gate has a light beam aperture 68 aligned with the aperture 38, permitting light reflected from mirror 58 to pass through the film strip 28 and out through the aperture 38. The dimensions of this aperture 68 are substantially the same as the dimensions of the image frame of the film strip and therefore this aperture masks the reflected light beam to the size of the film strip image frame.

The front gate 62 is adapted to reciprocate longitudinally (i.e., parallel to the plane of aperture 38) between upper and lower stops 78 and 80 that protrude from the web 20 adjacent to the peripheral wall 18. Upper front gate stop 78 is adjacent to upper back gate stop 70 but lower front gate stop 80 is below lower back gate stop 72 so as to provide the necessary longitudinal reciprocating space for the front gate. When the front gate is in the upper position shown in FIG. 3, an image projecting aperture 86 therein is aligned with the aperture 38, permitting a film frame image to be projected through aperture 38. The dimensions of this aperture 86 are substantially the same as the dimensions of the film strip image frame and therefore this aperture masks the projected image and limits projection to the particular frame aligned with aperture 38. When the front gate is in its lower position, where it abuts the lower stop 80, the image projecting aperture 86 is completely out of alignment with aperture 38 and therefore image projection through the aperture 38 is gated (i.e., prevented).

The front face of the front gate has a trigger provided in the form of a pair of protruding tabs 88 with a recess 90 therebetween that extends into the front gate. These tabs extend into the actuating aperture 40 on the forward side of the peripheral wall 18 and reciprocate up and down therein as the front gate reciprocates. When the cartridge 10 is inserted into suitably adapted projection apparatus, the rectilinear actuating mechanism within the projection apparatus will couple to the tabs 88 or the recess 90 (as by a pin extending into the recess 90). Thus, as the actuating mechanism reciprocates upward and downward, the front gate will be reciprocated thereby advancing the film, frame-by-frame, past the aperture 38. It is emphasized that such an actuating mechanism does not contact the film, but only couples to the trigger. Thus, the critical alignment that would be necessary to ensure proper meshing between the film sprocket holes and such an external actuating mechanism, were film advancement to be directly effected by contact between such an actuating mechanism and the film, is not required.

Arcuate film guideways are provided leading into and out of the film advancement and image gating assembly 60. The upper lead-in guideway is defined by arcuate inner and outer sections 92 and 94 that protrude from the web 20. The lower lead-out guideway is defined by arcuate inner and outer sections 96 and 98 that protrude from the web 20. The arcuate inner sections 92 and 96 are interconnected by a rib 99 that also protrudes from the web 20 to serve as a barrier preventing the film strip 28 from interfering with or becoming damaged by the operating components previously described that are located forwardly of the rib 99. The side cover 14 is also provided with protruding sections 100, 101, 102, 103 and 104 that are aligned with the sections 92, 94, 96, 98 and 99 to provide guideways and a barrier acting on the opposite edge of the film strip. Upper and lower arcuate rear guides 105 and 106 in the corners of wall 18 and corresponding upper and lower arcuate rear guides in the corners of lip 26 may be provided to prevent the film strip 28 from binding in the corners of the storage space behind the barrier ribs.

With the exception of the mirror 58, the film advance and image gating assembly 60 and the spring clip 65, all of the elements referred to above are preferably molded into the cover 14 or into the container 12. Thus, assembly of the film-side of this cartridge is extremely simple and convenient, being merely the gluing of the mirror 58 in position, the insertion of the spring clip 65 and the insertion of the front and back gates 62–64. The film strip 28 is then inserted between the front and back gates, into the lead-in and lead-out guideways, and into the storage space behind the barrier ribs 99–104.

The structure of the front and back gates that accomplishes the frame-by-frame film advancement is shown in FIGS. 7–18.

Each of the film gates, front gate 62 and back gate 64, are preferably molded from a suitable plastic to the configurations shown, with the various cross-sectional thickness designed to prevent warpage resulting from molding. The adjacent inner surfaces of each gate are provided with a set of two parallel side rails 110–112 for the front gate 114–116 for the back gate, which have flat surfaces that are of a width approximately equal to the non-image containing side sections of the film that contain the rectangular film sprocket holes or slots. In between the side rails of each gate, the inner web surfaces thereof are recessed above (at 118 for the front gate and at 120 for the back gate) and below (at 122 for the front gate and at 124 for the back gate) the respective aperture 86 or 68 with sloping transition surfaces therebetween as shown in FIGS. 9, 10 and 12. Each respective aperture 86 or 68 is bounded on the inner face of its gate by the respective side rails and by upper and lower sections 126–128 for the front gate and 130–132 for the back gate, that extend between the respective side rails. The inner faces of the sections 126–128–130 are flush with the faces of their respective side rails. The top and bottom ends of each side rail are tapered outward and away from the adjacent gate as shown in FIGS. 9–11.

The outer rearward surface of the back gate is provided with upper and lower hollow conical protrusions 91 and 93 that receive the ends of the arcuate arms of spring 65. The back gate is also provided with relatively sharply inclined side walls 95 and 97 that slope inwardly to the plane of aperture 68 and less sharply-inclined upper and lower walls 99 and 101 that also slope inwardly to the plane of aperture 68.

The front gate is provided with relatively sharply inclined side and upper and lower top walls 103–105 and 104–109 that slope inwardly to the plane of aperture 86.

The front gate is provided with an upper and a lower section of film sprocket hole-engaging teeth, each set comprising two teeth 134–136 and 138–140 that are positioned opposite one another, with one tooth on each side rail as shown in FIG. 9, and that protrude outwardly from the flat surface of their respective side rails. The teeth of the lower set flank the lower edge of the aperture 86 and the teeth of the upper set are positioned on their respective side rail and ¾ of the distance toward the upper end from the lower set. Two sets of transverse grooves or notches are positioned equidistant between one another and between the upper and lower sets of teeth, each set comprising two grooves 142–144 and 146–148 that are positioned opposite one another, with one groove on each side rail as shown in FIG. 9, and that are formed in the flat surface of their respective side rail. Two additional sets of transverse grooves or notches also are positioned equidistant between one another below the lower set of teeth, each such set comprising two grooves 150–152 and 154–156 positioned opposite one another, with one groove on each side rail as shown in FIG. 9. The spacing between the adjacent teeth and grooves on each rail are equal to the spacing between the film sprocket holes.

The back is also provided with upper and lower sets of film sprocket hole-engaging teeth, each set comprising two teeth 160–162 and 164–166 that are positioned opposite one another, with one tooth on each side rail as shown in FIG. 10, and that protrude outwardly from the flat surface of their respective side rail. The teeth of the upper set flank the upper edge of the aperture 68 and the teeth of the lower set are positioned on their respective side rail about ¾ of the distance toward the lower end from the upper set. Two sets of transverse grooves or notches are positioned equidistant between one another above the upper set of teeth, each set comprising two grooves 168–170 and 172–174 that are positioned opposite one another, with one groove on each side rail as shown in FIG. 10, and that are formed in the flat surface of their respective side rail. Two additional sets of transverse grooves also are positioned equidistant between one another and between the upper and lower sets of teeth, each such set comprising two grooves 176–178 and 180–182 positioned opposite one another, with one groove on each side rail as shown in FIG. 10. The spacing between the adjacent teeth and grooves on each rail are equal to the spacing between the film sprocket holes.

It is apparent from FIGS. 9–12 that, when the apertures 86 and 68 are aligned with the gates in operable face-to-face adjacency, the teeth on each rail surface protrude into grooves on the opposite gate. Thus, teeth 138–140 and 134–136 on the front gate will protrude into grooves 176–178 and 168–170, respectively, on the back gate. Likewise, teeth 160–162 and 164–166 on the back gate will protrude into grooves 146–148 and 154–156 on the front gate.

The operating sequence of the front and back gates is illustrated in FIGS. 15–18. FIG. 15 shows the apertures 86 and 68 aligned and the film contained between the gates by the teeth protruding through the film sprocket holes into the respective grooves. In this configuration, the frame held between the gates for projection of its image is confined on the sides by the adjacent sections of the side rails 110–112–114–116 and is confined on the top and bottom by the sections 126–128–130–132 extending between the respective side rails. Thus, this frame is properly positioned and aligned with respect to the apertures 86 and 68 for projection.

When the front gate is moved downwardly (FIG. 16) the teeth will ride out of their respective grooves, the back gate being moved rearwardly against the action of the arcuate arms of spring 65. The front gate teeth will remain inserted through the film sprocket holes and the film will be advanced with the front gate. The back gate teeth now contact the film between the film sprocket holes to maintain the film against the front gate and retained by the front gate teeth. It will be noted that as the front gate aperture is moved downwardly, the projected image will also move downward out of alignment with the cartridge aperture 38, but that the "next image frame" being advanced into alignment with cartridge aperture 38, will not be projectable because the solid front gate section above aperture 86 will move into alignment with cartridge aperture 38 along with the next image frame.

When the film has been advanced one frame (FIG. 17), the teeth will protrude into the now adjacent grooves, the back gate will move forwardly under the action of spring 65, and the film will be confined as in FIG. 15, except that apertures 86 and 68 will be completely out of alignment so that no image projection can occur.

When the front gate is advanced upward (FIG. 18), the teeth will again ride out of registry with the grooves, the back gate being moved rearwardly against the action of spring 65. The back gate teeth will remain inserted through the film sprocket holes and the film held stationary with the back gate. The front gate teeth now contact the film between the film sprocket holes to maintain the film against the back gate and retained by the back gate teeth. As the front gate aperture 86 moves into alignment with the cartridge aperture 38, the previously-referenced "next-image frame," or "newly-advanced frame," will be progressively exposed for projection.

When the front gate returns to its FIG. 15 position, the teeth will protrude into the adjacent grooves and the back gate will move forward under the action of spring 65 to shift the "next image frame" into its proper projection plane. The apertures 86 and 68 again will be aligned for image projection of the "newly-advanced frame."

The teeth preferably are adapted to closely fit the film sprocket holes. They have an acute leading edge rake angle such that the leading edges of the teeth are inclined in the direction of film advance and an obtuse trailing edge rake angle such that the trailing edges of the teeth are also inclined in the direction of film advance. Thus, the film is carried by the leading edges of the front gate teeth when the front gate advances the film one frame, and the film sprocket holes previously overlying the back gate teeth are drawn from the back gate teeth over the trailing edges of such teeth. When the front gate returns to its image projection position after having advanced the film one frame, the film is retained against the leading edges of the back gate teeth, and the front gate teeth, previously inserted through the film sprocket holes, are drawn out of the sprocket holes.

All of the teeth are preferably identical and have the structure shown in FIGS. 13 and 14. Each tooth has an inclined leading edge 1 with an acute, or a positive, rake angle as shown in FIG. 14, a round leading tip 2, a rectangular flat end 3, an inclined trailing edge 4 with an obtuse, or negative, rake angle as shown in FIG. 14, a relatively sharply-inclined outer side edge 5, and a less sharply-inclined inner side edge 6. The steepness of the outer side edges facilitate the alignment and positioning of the film on the teeth both during and between periods of film advancement. The slope of edges 6 is preferably the same as the transition surface between the side rail, from which the tooth protrudes, and the recessed surface between the side rails. The edges 6 are thus extensions of such transition surfaces, the more gradual slope of which facilitate insertion and removal of the film between the gates in that the film edges are not damaged by traverse of these side edges. The flatness of the ends reduces film abrasion due to relative movement between the teeth and the film as the film is advanved. The positive rake angle of the leading edges facilitates retention of the film on the proper teeth. The negative rake angle of the trailing edges facilitates withdrawal of those teeth on which the film is not to be retained during the film advance cycle.

All of the grooves are identical in cross-section as shown in FIG. 14, comprising upper and lower inwardly sloping sides 7, respectively, and a flat bottom 8. The slope of the sides is the same as the slope of the teeth trailing edges 4 and the bottom is slightly wider, top-to-bottom, than the width of teeth flat ends 3. The depth of the grooves is such that a small clearance is provided between the groove bottoms 8 and the teeth flat ends 3 parallel thereto, and between groove sides and the teeth trailing edges 4 parallel thereto, such clearances being less than the differences in top-to-bottom width between the groove bottoms 8 and the teeth flat ends 3. Thus, movement of the front gate downward from the FIG. 15 position will cause the trailing edges of the back gate teeth to contact the adjacent upper sides of the front gate grooves to force the back gate rearward as the front gate back gate teeth ride out of their respective grooves. Likewise, movement of the front gate upward from the FIG. 17 position will cause the trailing edges of the front gate teeth to contact the adjacent upper sides of the back gate grooves to force the back gate rearward as the front gate and back gate teeth ride out of their respective grooves.

In both directions of front gate movement, it will be noted, the tips of the teeth leading edges do not contact the sides of the grooves and thus will not become worn or abraded as might be the case if such contact existed. Inasmuch as the teeth are identical in height, the film retaining teeth will clear the opposing gate by the thickness of the film during front gate transitional movement, as shown in FIGS. 16 and 18.

Two sets of teeth on each gate are preferred. Two sets on the gate that retains the film will ensure that the film is retained even if a splice reduces or eliminates the necessary film sprocket hole engagement of the leading edges of the teeth of one set. Two sets on the gate that do not retain the film ensure that the sliding contact between the teeth and the film will occur only between the film sprocket holes and not across the image frames.

The tape storage and dispensing assembly 32 comprises a flat circular disk 200 with an axial tape hub 202 rigidly mounted thereto, a tape guide 204 and a tape roller and disk assembly 206. The disk is axially mounted on a stub shaft 208 that protrudes from the web 20. Shaft 208 supports the disk outwardly from the web 20 so that the disk is freely rotatable. The tape 30 is wound around the hub 202 with the inner tape end pulled out from the hub and spliced to the outer tape end to form a continuous tape coil.

The tape guide 204 comprises a flat plate 210 of special geometry that overlays a segment of the circular disk 200 to help maintain the integrity of the tape coil and to help guide the tape out from the hub. The rearward end of the plate 210 is positioned by a tab 212 on its inner side that fits between two tabs 214 protruding from the web 20. The forward end of the plate 210 is positioned by a pin 215 on its inner side that fits into a boss 216 protruding from the web 20. The plate 210 has an edge 218 rounded in bull nose fashion that extends from the rear non-tangentially toward the rim of hub 202 and, from a point in close proximity to the hub rim, extends tangentially away from the hub rim toward the front of the cartridge to a rounded nose 220. The opposite edge 222 of the plate 210 is rounded in bull nose fashion and is provided with a V-notch 224, the apex of which is positioned adjacent to the terminus of the tangential section of edge 218 and the beginning of nose 220. A rounded guide leg 226 extends from the inner side of plate 210 to the web 20, such leg being positioned at the upper end of the forward side of the V-notch 224.

The tape roller and disk assembly 206 comprises a lever 226 mounted rotatably against the web 20 on a spindle or boss 24′ that protrudes from web 20, a roller 230 journal-mounted to one leg of the lever 226 opposite and adjacent to the lower section of cartridge aperture 42, a pressure plate 232 in the form of a section of the other leg of lever 226 that is bent perpendicularly thereto and adapted to tangentially contact the edge of tape disk 200, and a compression spring clip 234 confined between tabs 236 on the bottom wall of side 18 and a slot in the pressure plate 232 to urge the pressure plate against the disk 200 to prevent the latter from rotating. This prevents the disk from rotating and entangling the tape when the cartridge is not in use.

Two semi-circular rims 238 and 240 protrude from the web 20 and are adapted to facilitate positioning the tape disk 200 therebetween and over the stub shaft 208. The tape-side cover 16 also is provided with a stub shaft 242 that telescopes over the end of stub shaft 208 to further ensure proper positioning of the tape disk 200.

The tape is run from the hub 202 up over the tangential section of edge 218, which turns it to a face-up position, across the face of plate 210, down through the V-notch 224, around the guide leg 226 which turns it back to its original edge-up position, and past pin 215 and around roller 230 back to the outer periphery of the tape coil. When the cartridge is inserted into a suitable projector, the projector capstan drive will contact the roller 230, with the tape pinched between the two, and push it rearward, thereby swinging the pressure plate 232 away from its braking position against the tape disk 200, as shown in FIG. 6 in phantom. Insertion of the cartridge into a suitable projector will also effect the insertion of a sound reproducing head through aperture 42 above the roller 230 and into contact with the tape, as also shown in phantom in FIG. 6. Thus, when the capstan drive rotates, the tape will be drawn from the hub-side of the tap coil, past the sound head, between the capstan drive and roller 230, and wound back onto the outer periphery of the tape coil.

As can be ascertained from the foregoing description, assembly of the tape side of the cartridge is exceedingly simple, there being only four separate components (the tape disk 200, the plate 210, the lever 226 and the spring 234) in addition to the tape side cover 16 to assemble. Consequently, sound sound tapes mounted on disks such as disk 200 can be quickly and easily mounted by one having little skill or training. This is an advantage not only in the original assembly of the cartridge but also when the cartridge user desires to interchange or replace sound tapes.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and the hereto annexed claims be given the broadest interpretation to which the employed language fairly admits.

For example, the film could be provided as on a spool in the same manner as the tape described above. Further, the tape could be provided in strip form in the same manner as the film strip described above.

The embodiments of the invention in which an exclusive property or privilege is claimed are defined as follows:

1. A film projection cartridge which comprises a housing, adapted to contain film for projection, having an image projection aperture and an actuating aperture in one side thereof; and film advance and image gating means adapted to guidingly advance the film past the cartridge image projection aperture, gate the film frames during film advancement, and mask film frames aligned with said cartridge image projection aperture for image projection, such means having a section aligned with the cartridge actuating aperture and adapted to be coupled to an external actuating mechanism to effect film advancement.

2. The cartridge of claim 1 wherein said film advance and image gating means comprises a longitudinally-movable first gate member having an image projecting aperture alignable with said cartridge image projection aperture and including said section aligned with said cartridge actuating aperture; and a second gate member having a light beam aperture aligned with said cartridge image projection aperture; the first and second gate members having cooperating adjacent surfaces adapted to contain film therebetween and to advance the film when said first gate member is moved so as to shift its image projecting aperture out of alignment with said cartridge image projection aperture.

3. The cartridge of claim 2 including first guide means for said second gate member permitting lateral movement of said second gate member toward and away from said cartridge image projection aperture, second guide means for said first gate member permitting longitudinal movement of said first gate member parallel to said cartridge image projection aperture, spring means urging said second gate member toward said cartridge projection aperture, and third guide means for guiding film to and from said first and second gate members.

4. The cartridge of claim 2 wherein said first and second gate members are each provided with co-operable film sprocket hole engaging teeth and grooves adapted to receive teeth of the other gate member; said teeth and grooves being so arranged that film is carried by said first gate member when said first gate member is moved so as to transfer its image projecting aperture out of alignment with said cartridge image projection aperture, and being so arranged that film is retained by said second gate member when said first gate member is moved so as to transfer its image projecting aperture into alignment with said cartridge projection aperture.

5. The cartride of claim 4 wherein each tooth is provided with a leading edge oriented in the direction of film advancement and having a positive rake angle, and a trailing edge having a negative rake angle; and wherein the grooves are so designed that the trailing edges of the teeth, that are withdrawn from film sprocket holes during movement of said first gate member, contact the sides of grooves in the other gate member to urge said second gate member away from said cartridge image projection aperture.

6. The cartridge of claim 4 wherein each tooth is provided with a relatively steeply inclined outer side edge, a relatively less-steeply inclined inner side edge, and a flattened tip.

7. The cartridge of claim 4 wherein each gate member is provided with parallel, film-contacting side rails in and on which said grooves and teeth are provided; and parallel, film-contacting cross rails, which, with intermediate sections of the side rails, define the respective gate member apertures; and wherein a set of two teeth on one gate member flank one edge of its aperture and a set of two teeth on the other gate member flank the opposite edge of its aperture such that a film frame is retained by the two sets of teeth and confined on both sides by said cross rails and the intermediate sections of said side rails when said first gate member image projecting aperture is aligned with said cartridge image projection aperture.

8. The cartridge of claim 1 including a cover for said housing provided with a recess and a reflection mirror mounted therein for reflecting a light beam through said means to project film images from said cartridge image projection aperture.

9. The cartridge of claim 1 wherein said housing is adapted to contain a sound tape and has a tape drive and sound head receiving aperture in said one side thereof; and including a tape storage and dispensing assembly contained in said housing.

10. The cartridge of claim 9 wherein said tape storage and dispensing assembly comprises a disk rotatably mounted in said housing; an axial tape hub affixed to said disk and adapted to having an endless tape coil wound thereon with the tape extending out from the hub and returning to the outer periphery of the coil; a tape guide member overlaying a segment of said disk and adapted to guide the tape out from the hub and direct it toward said cartridge tape drive and sound head receiving aperture; and a tape roller and disk brake assembly comprising a lever member pivotally-connected to said housing and provided with a disk pressure plate, a roller journal-mounted to said lever and positioned by said lever adjacent to said cartridge tape drive and sound head receiving aperture and adapted to have the tape extended therearound such that the tape extends past and adjacent to said cartridge tape drive and sound head receiving aperture, and spring means urging said pressure plate against said disk to prevent said disk from rotating until an external tape drive element is drivingly engaged with said roller and the tape extended therearound.

11. The cartridge of claim 10 wherein said tape guide member comprises a plate having a first edge with a section thereof extending tangentially from said hub in proximity to the point where the tape is drawn from said hub to facilitate withdrawal of the tape therefrom and to turn the tape to a face-up position, and having a second edge with a V-notch therein adapted to receive the tape as it extends across said plate; and comprises a guide leg positioned at the end of one side of the notch and adapted to turn the tape back to an edge-up position and to direct the tape toward said cartridge tape drive and sound head receiving aperture.

12. The cartridge of claim 9 wherein said housing is provided with a web dividing said housing into film and sound tape compartments; and including a cover for said housing provided with an opening for ambient air circulation into said film compartment; and wherein said web is provided with apertures permitting air circulating in said film compartment to pass into said sound tape compartment for removal of dust from said tape compartment.

13. The cartridge of claim 3 including first guide means for said second gate member permitting lateral movement of said second gate member toward and away from said cartridge image projection aperture, second guide means for said first gate member permitting longitudinal movement of said first gate member parallel to said cartridge image projection aperture, spring means urging said second gate member toward said cartridge projection aperture, and third guide means for guiding film to and from said first and second gate members.

14. The cartridge of claim 1 including a cover for said housing provided with an opening for ambient air entry thereinto for circulation against film confined by said film advance and image gating means and for circulation around said film to pre-warm said film.

15. A film projection cartridge which comprises a housing partitioned into two side-by-side sections, one section adapted to contain film for projection and the other section adapted to contain a sound tape, one side of said housing having an image projection aperture and an actuating aperture opening to the film side thereof and having a tape drive and sound head receiving aperture opening to the tape side thereof; film advance and image gating means adapted to guidingly advance the film past the cartridge image projection aperture, gate the film frames during film advancement, and mask film frames aligned with said cartridge image projection aperture for image projection, such means having a section aligned with the cartridge actuating aperture and adapted to be coupled to an external actuating mechanism to effect film advancement; and a tape storage and dispensing assembly adapted to extend sound tape past the cartridge tape drive and sound head receiving aperture.

16. The cartridge of claim 15 wherein said film advance and image gating means comprises a longitudinally-moveable first gate member having an image projecting aperture alignable with said cartridge image projection aperture, and including said section aligned with said cartridge actuating aperture; and a second gate member having a light beam aperture aligned with said cartridge image projection aperture; the first and second gate members having cooperating adjacent surfaces adapted to contain film therebetween and to advance the film when said first gate member is moved so as to shift its image projecting aperture out of alignment with said cartridge image projection aperture.

17. The cartridge of claim 16 wherein said first and second gate members are each provided with co-operable film sprocket hole engaging teeth and grooves adapted to receive teeth of the other gate member; said teeth and grooves being so arranged that film is carried by said first gate member when said first gate member is moved so as to transfer its image projecting aperture out of alignment with said cartridge image projection aperture, and being so arranged that film is retained by said second gate member when said first gate member is moved so as to transfer its image projecting aperture into alignment with said cartridge projection aperture.

18. The cartridge of claim 17 wherein each tooth is provided with a leading edge oriented in the direction of film advancement and having a positive rake angle, and a trailing edge having a negative rake angle; and wherein the grooves are so designed that the trailing edges of the teeth, that are withdrawn from film sprocket holes during movement of said first gate member, contact the sides of grooves in the opposing gate member to urge said second gate member away from said cartridge image projection aperture.

19. The cartridge of claim 17 wherein each tooth is provided with a relatively steeply inclined outer side edge, a relatively less-steeply inclined inner side edge, and a flattened tip.

20. The cartridge of claim 17 wherein each gate member is provided with parallel, film-contacting side rails in and on which said grooves and teeth are provided; and parallel, film-contacting cross rails which, with intermediate sections of the side rails, define the respective gate member apertures; and wherein a set of two teeth on one gate member flank one edge of its aperture and a set of two teeth on the other gate member flank the opposite edge of its aperture such that a film frame is retained by the two sets of teeth and confined on both sides by said cross rails and intermediate sections of said side rails when said first gate member image projecting aperture is aligned with said cartridge image projection aperture.

21. The cartridge of claim 15 including a cover for said housing provided with a recess and a reflection mirror mounted therein for reflecting a light beam through said means to project film images from said cartridge image projection aperture.

22. The cartridge of claim 15 wherein said tape storage and dispensing assembly comprises a disk rotatably mounted in said housing; an axial tape hub affixed to said disk and adapted to having an endless tape coil wound thereon with the tape extending out from the hub and returning to the outer periphery of the coil; a tape guide member overlaying a segment of said disk and adapted to guide the tape out from the hub and direct it toward said cartridge tape drive and sound head receiving aperture; and a tape roller and disk brake assembly comprising a lever member pivotally-connected to said housing and provided with a disk pressure plate, a roller journal-mounted to said lever and positioned by said lever adjacent to said cartridge tape drive and sound head receiving aperture and adapted to have the tape extended therearound such that the tape extends past and adjacent to said cartridge tape drive and sound head receiving aperture, and spring means urging said pressure plate against said disk to prevent said disk from rotating until an external tape drive element is drivingly engaged with said roller and the tape extended therearound.

23. The cartridge of claim 22 wherein said tape guide member comprises a plate having a first edge with a section thereof extending tangentially from said hub in proximity to the point where the tape is drawn from said hub to facilitate withdrawal of the tape therefrom and to turn the tape to a face-up position, and having a second edge with a V-notch therein adapted to receive the tape as it extends across said plate; and comprises a guide leg positioned at the end of one side of the notch and adapted to turn the tape back to an edge-up position and to direct the tape toward said cartridge tape drive and sound head receiving aperture.

References Cited

UNITED STATES PATENTS

| | | | |
|---|---|---|---|
| 2,374,828 | 5/1945 | Miller | 352—227 |
| 2,391,497 | 12/1945 | Wilson | 352—73 |
| 2,853,923 | 9/1958 | Daniel | 352—31 |
| 3,271,095 | 9/1966 | Jensen | 352—34 |
| 3,375,054 | 3/1968 | Hughes | 352—72 XR |

NORTON ANSHER, Primary Examiner

D. S. STALLARD, Assistant Examiner

U.S. Cl. X.R.

352—72, 126, 166, 191, 221